F. O. BALL.
CROSS HEAD.
APPLICATION FILED JUNE 8, 1908.
924,876.
Patented June 15, 1909.
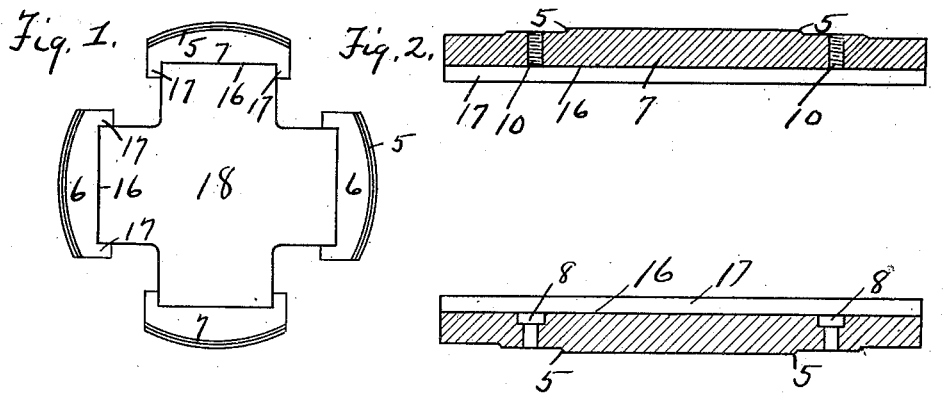
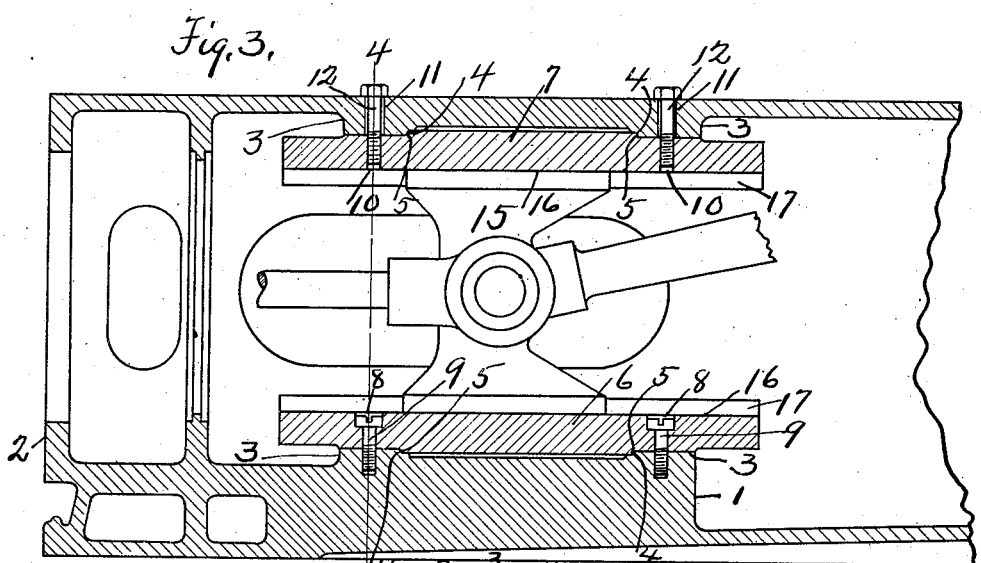
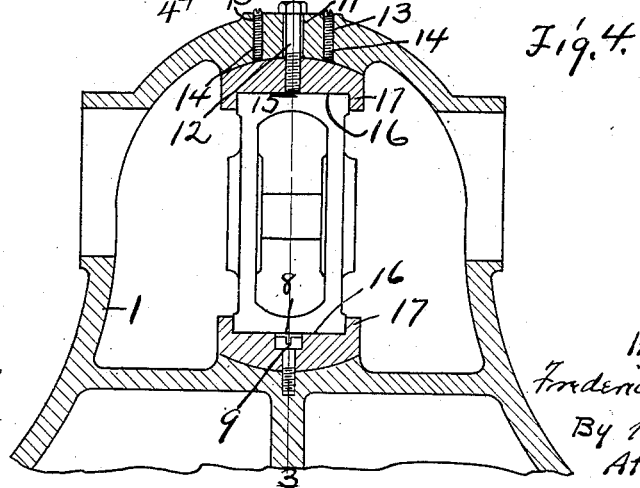
Witnesses
Inventor
Frederick O. Ball
By his Attorney

UNITED STATES PATENT OFFICE.

FREDERICK O. BALL, OF PLAINFIELD, NEW JERSEY.

CROSS-HEAD.

No. 924,876.  Specification of Letters Patent.  Patented June 15, 1909.

Application filed June 8, 1908. Serial No. 437,305.

*To all whom it may concern:*

Be it known that I, FREDERICK O. BALL, a citizen of the United States, residing at Plainfield, in the county of Somerset and State of New Jersey, have invented new and useful Improvements in Cross-Heads, of which the following is a specification.

This invention relates to cross-heads, and consists in certain improvements in the construction thereof as will be hereinafter fully described and pointed out in the claim.

More particularly the invention relates to an improvement in the construction and mounting of the cross head guides, and is of the same general type of construction as shown in my patent April 21st, 1908, No. 885,132.

The invention is illustrated in the accompanying drawings as follows: Figure 1 is an end view of a series of guides indicating the method of manufacture. Fig. 2 a section of two cross head guides in proper relation to each other and detached, the section being a vertical longitudinal section. Fig. 3 a section on the line 3—3 in Fig. 4. Fig. 4 a section on the line 4—4 in Fig 3.

1 marks the engine frame; 2 the end of the frame to which a cylinder may be attached; 3—3 guide supports on the frame; 4—4 shoulders formed on said supports against which the shoulders 5 on the guides 6 and 7 abut to prevent end movement. The guide 6 is provided with the counter sunk holes 8. The screws 9 extending through these holes 8, and are screwed into the supports 3. The guide 7 is provided with the screw threaded holes 10, and the upper supports 3 with the holes 11 through them. The bolts 12 extend through the openings 11 into the screw threaded openings 10, and by means of these the guide 7 is secured in place.

In order to provide for the adjustment of the guides, I provide the supports 3 at the top of the frame with screw threaded openings 13, one at each side of the opening 11 and arrange the screws 14 in these openings. By turning the screws 14, the guide 7 may be adjusted as desired and when adjusted can be locked in adjustment by the bolt 11. So far the construction is, that shown in my former patent.

The cross head 15 is of the ordinary construction, but is provided with flat guide surfaces instead of cylindrical surfaces as shown in my former patent. These guide surfaces operate upon the surface 16 on the guides 6 and 7. Ledges 17 extend down each side of the cross head and form bearings at the sides of the cross head. The supports 3—3 are bored out forming cylindrical seats for the cross head guides, and the cross head guides are preferably formed by machining the side surfaces and placing the guides so machined on a frame 18, then turning the guides so mounted, so that the guides are provided with the cylindrical seat surfaces of the same diameter as the surfaces in the frame. The guides may be thus seated on the seat surfaces in the frame.

I prefer to form the perforations 11 slightly larger than the bolts 12, so that the guide 7 may be adjusted circumferentially so as to be directly opposite the guide 6, the flat guide surfaces will be parallel, and the ledges will also be parallel, so that the guides will be brought into perfect alinement for the reception of the cross head.

This construction is one, that can be readily manufactured and avoids the usual difficulties in adjusting or locating flat surface guides of this character.

What I claim as new is:

The combination of an engine frame with cylindrical guide seats opposingly placed thereon and having a common axis; cross head guides arranged on said guide seats having cylindrical seat surfaces for seating on said seats and flat guide surfaces, said guides having side ledges; and means for securing one of said guides on one of said seats, said means permitting the adjustment of said guide circumferentially for the purpose described.

In testimony whereof I have hereunto set my hand in the presence of two subscribing witnesses.

FREDERICK O. BALL.

Witnesses:
D. M. RUNYON,
W. E. DAY.